(12) United States Patent
Chang

(10) Patent No.: US 7,751,100 B2
(45) Date of Patent: *Jul. 6, 2010

(54) METHOD AND APPARATUS FOR GUIDING A CABLE IN A SCANNER

(76) Inventor: Yu-Shan Chang, No. 1-2, Sec. 3, Wuchiuan W. Rd., Taichung (TW)

( * ) Notice: Subject to any disclaimer, the term of this patent is extended or adjusted under 35 U.S.C. 154(b) by 203 days.

This patent is subject to a terminal disclaimer.

(21) Appl. No.: 11/508,022

(22) Filed: Aug. 21, 2006

(65) Prior Publication Data

US 2006/0279806 A1 Dec. 14, 2006

Related U.S. Application Data

(63) Continuation of application No. 10/263,178, filed on Oct. 3, 2002, now Pat. No. 7,095,532.

(51) Int. Cl.
H04N 1/04 (2006.01)
H04N 1/40 (2006.01)
H01B 7/08 (2006.01)
H02G 3/00 (2006.01)

(52) U.S. Cl. .................. 358/497; 358/471; 358/474; 358/483; 174/117 FF

(58) Field of Classification Search ............... 358/471, 358/474, 483, 482, 497, 487, 505, 506, 512–614; 250/208.1, 234–236, 216, 239; 399/211, 399/212; 174/99 R, 117 F, 117 A, 117 FF; 382/312, 318, 319

See application file for complete search history.

(56) References Cited

U.S. PATENT DOCUMENTS

| 4,987,442 | A |  | 1/1991 | Uemori |
| 6,036,259 | A | * | 3/2000 | Hertel et al. ........... 296/216.01 |
| 6,330,084 | B1 |  | 12/2001 | Chiang |
| 6,552,272 | B1 |  | 4/2003 | Sheng et al. |
| 6,576,840 | B1 |  | 6/2003 | Huang et al. |
| 6,717,702 | B1 |  | 4/2004 | Yamauchi et al. |
| 6,903,849 | B2 |  | 6/2005 | Yokota |
| 6,953,898 | B2 |  | 10/2005 | Chen et al. |
| 6,958,830 | B2 |  | 10/2005 | Kono |
| 6,975,436 | B2 |  | 12/2005 | Saito |
| 7,095,532 | B2 | * | 8/2006 | Chang ....................... 358/471 |
| 7,116,451 | B2 | * | 10/2006 | Chang ....................... 358/497 |
| 2005/0011665 | A1 | * | 1/2005 | Youngers et al. ......... 174/117 F |
| 2006/0033775 | A1 |  | 2/2006 | Tsai et al. |

FOREIGN PATENT DOCUMENTS

JP 2005115031 4/2005

OTHER PUBLICATIONS

USPTO; Notice of Allowance for U.S. Appl. No. 10/263,178 to Chang dated Mar. 30, 2006.
USPTO; File History for U.S. Appl. No. 11/505,563 to Chang filed Aug. 16, 2006.
USPTO; File History for U.S. Appl. No. 10/263,183 to Chang filed Oct. 3, 2002.

* cited by examiner

*Primary Examiner*—Cheukfan Lee
(74) *Attorney, Agent, or Firm*—Stolowitz Ford Cowger LLP

(57) ABSTRACT

A scanning apparatus includes a housing with a flatbed. A loading glass is installed at the scan flatbed for loading a to-be-scanned document. A photoelectric sensing device is disposed in the housing for sensing the light signals corresponding to the to-be-scanned document to generate electric signals. The electric signals are transmitted through a flat cable to a motherboard. When the photoelectric sensing device shifts and the flat cable touches the bottom of the housing, the first adsorptive slice of the flat cable and the second adsorptive slice on the bottom of the housing adsorb each other. Therefore, the rubbing between the flat cable and the loading glass can be avoided and the quality of the scanning images can be improved.

21 Claims, 4 Drawing Sheets

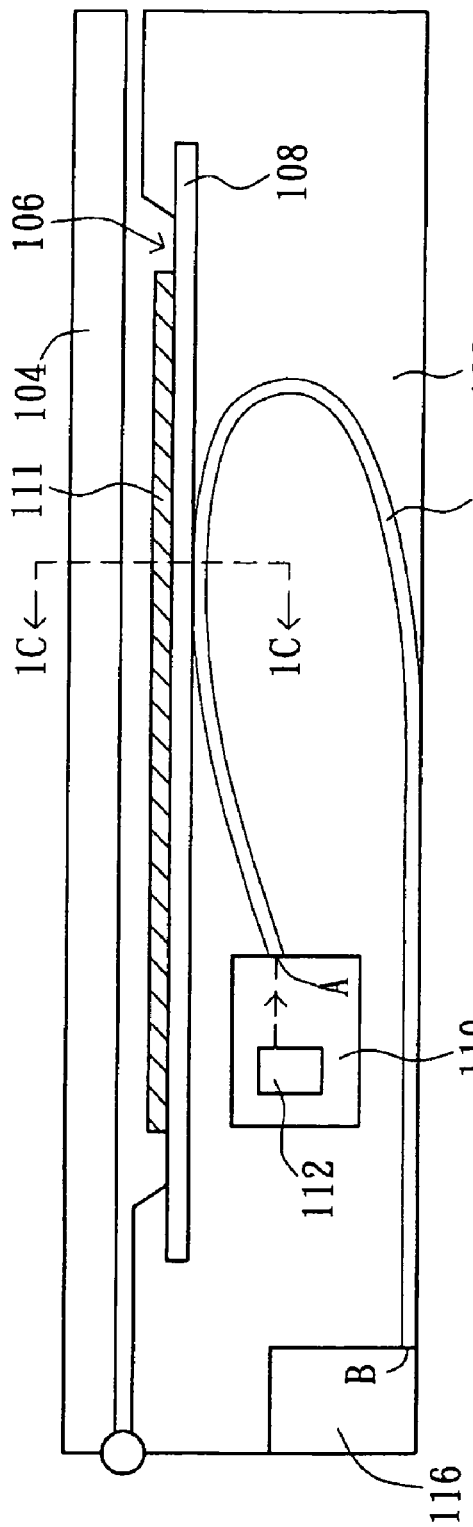
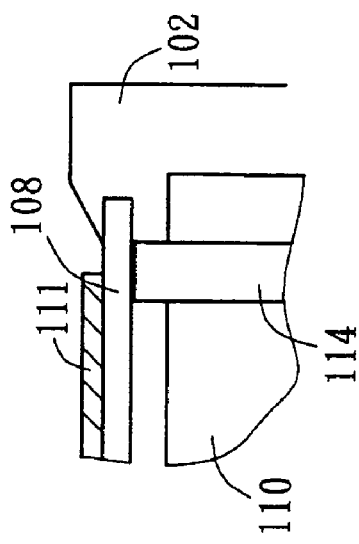
FIG. 1A (PRIOR ART)
FIG. 1C (PRIOR ART)

METHOD AND APPARATUS FOR GUIDING A CABLE IN A SCANNER

This application is a continuation of U.S. application Ser. No. 10/263,178 now U.S. Pat. No. 7,095,532, filed on Oct. 3, 2002, entitled "Scanning Apparatus," the contents of which are incorporated by reference in their entirety.

This application incorporates by reference Taiwanese application Serial No. 91116066, Filed Jul. 18, 2002.

BACKGROUND OF THE INVENTION

1. Field of the Invention

The invention relates in general to a scanning apparatus, and more particularly to a scanning apparatus capable of reducing the abrasion of the loading glass and thus improving the quality of the scanning image.

2. Description of the Related Art

With the progress and evolution of technology, the integration and application of multi-media have become the current trend. Multimedia is the use of computers to present different types of information, such as text, images and sound, in an integrated way. Several multi-media devices capable of capturing images and sounds are therefore developed. In terms of the image processing, the scanning apparatus is a common tool for users to capture images.

Referring to FIG. 1A, a lateral view of a conventional flatbed scanner is shown. The flatbed scanner includes a housing 102, and a cover 104. The housing 102 includes a scan flatbed 106 or a so-called window area. A loading glass 108 is installed at the scan flatbed 106 for loading a to-be-scanned document 111. The scanning operation is performed as the following. The to-be-scanned document 111 is placed on the scan flatbed 106 and then the cover 104 is closed. A photoelectric sensing device 110 in the housing 102 is driven to sense the to-be-scanned document 111. A light-sensing module 112 in the photoelectric sensing device 110 then transforms the received image signals to electric signals. The electric signals are further transmitted to a motherboard 116 by a flat cable 114 so that the images sensed by the light-sensing module 112 can be output. The light-sensing module 112 can be a charge coupled device (CCD) or a contact image sensor (CIS) to achieve the above-mentioned purpose.

After the first signals in the light-sensing module 112 are output, the photoelectric sensing device 110 is further shifted slightly to scan the left part of the to-be-scanned document 111 by a step motor (not shown). Subsequently, the light-sensing module 112 is driven again to sense the to-be-scanned document 111. The sensed image signals are then transmitted by the flat cable 114 and output by the motherboard 116. By performing the procedure mentioned above repeatedly, the scanning progress can be completed step by step. The procedures described above can be applied to both reflective documents and transmissive documents since these two kinds of documents are different in the locations of the light sources (not shown) but the same in the progress of photoelectric sensing devices 110 to sense the documents and the connection between the photoelectric sensing device 110 and the flat cable 114. Therefore, the theorems for capturing images of two kinds of documents are also the same.

Referring to FIGS. 1A and 1B, a structural diagram of the connection between the photoelectric sensing device and the motherboard in a conventional flatbed scanner is shown. The flat cable 114, which is usually a soft cable, is located under the loading glass 108. The flat cable 114 is bent around the bottom of photoelectric sensing device 110; one terminal A of the flat cable 114 is connected to the photoelectric sensing device 110, and the other terminal B is connected to the motherboard 116. Therefore, in the natural condition, the flat cable 114 will form a raised part 118 with a height h. Because scanners nowadays are designed to be thinner and thinner, when scanners are fabricated, the raised part 118 of the flat cable 114 will easily touch the loading glass 108 at the scan flatbed 106 as shown in FIG. 1C. Subsequently, when the step motor drives photoelectric sensing device 110 to pre-scan or scan the to-be-scanned document 111, the raised part 118 of the flat cable 114 will rub against the loading glass 108 and result in friction traces at the loading glass 108 as time goes by. The friction traces on the loading glass 108 will obscure the light to penetrate and result in shadow traces on the scanning images. Therefore, the quality of scanning images is reduced largely.

SUMMARY OF THE INVENTION

Referring to FIG. 1A, a lateral view of a conventional flatbed scanner is shown. The flatbed scanner includes a housing 102, and a cover 104. The housing 102 includes a scan flatbed 106 or a so-called window area. A loading glass 108 is installed at the scan flatbed 106 for loading a to-be-scanned document 111. The scanning operation is performed as the following. The to-be-scanned document 111 is placed on the scan flatbed 106 and then the cover 104 is closed. A photoelectric sensing device 110 in the housing 102 is driven to sense the to-be-scanned document 111. A light-sensing module 112 in the photoelectric sensing device 110 then transforms the received image signals to electric signals. The electric signals are further transmitted to a motherboard 116 by a flat cable 114 so that the images sensed by the light-sensing module 112 can be output. The light-sensing module 112 can be a charge coupled device (CCD) or a contact image sensor (CIS) to achieve the above-mentioned purpose.

The invention achieves the above-identified objects by providing a scanning apparatus. The scanning apparatus has a housing with a scan flatbed, and a loading glass is installed at the scan flatbed for loading a to-be-scanned document. A photoelectric sensing device is disposed in the housing for sensing the light corresponding to the to-be-scanned document and transforming light signals into electric signals. A circuit board is disposed in the housing for outputting the electric signals. In addition, a flat cable connects the photoelectric sensing device to the circuit board and transmits the electric signals. The photoelectric sensing device is driven to scan the to-be-scanned document by repeating the procedure mentioned above and the scanning image is output to complete the scanning. The flat cable includes a first adsorptive slice and the bottom of the housing includes a second adsorptive slice. When the photoelectric sensing device is driven and the flat cable approaches the bottom of the housing, the first and the second adsorptive slices adsorb each other.

BRIEF DESCRIPTION OF THE DRAWINGS

Referring to FIGS. 1A and 1B, a structural diagram of the connection between the photoelectric sensing device and the motherboard in a conventional flatbed scanner is shown. The flat cable 114, which is usually a soft cable, is located under the loading glass 108. The flat cable 114 is bent around the bottom of photoelectric sensing device 110; one terminal A of the flat cable 114 is connected to the photoelectric sensing device 110, and the other terminal B is connected to the motherboard 116. Therefore, in the natural condition, the flat cable 114 will form a raised part 118 with a height h. Because scanners nowadays are designed to be thinner and thinner, when scanners are fabricated, the raised part 118 of the flat cable 114 will easily touch the loading glass 108 at the scan flatbed 106 as shown in FIG. 1C. Subsequently, when the step motor drives photoelectric sensing device 110 to pre-scan or scan the to-be-scanned document 111, the raised part 118 of the flat cable 114 will rub against the loading glass 108 and result in friction traces at the loading glass 108 as time goes by. The friction traces on the loading glass 108 will obscure the light to penetrate and result in shadow traces on the scanning images. Therefore, the quality of scanning images is reduced largely.

FIG. 1A (Prior Art) is a lateral view of a conventional flatbed scanner;

FIG. 1B (Prior Art) is a structural diagram showing the connection between the photoelectric sensing device and the motherboard in a conventional flatbed scanner;

FIG. 1C (Prior Art) is a cross-sectional view of the conventional flatbed scanner, taken along line 1C-1C of FIG. 1A;

DESCRIPTION OF THE PREFERRED EMBODIMENT

Figure 1B:
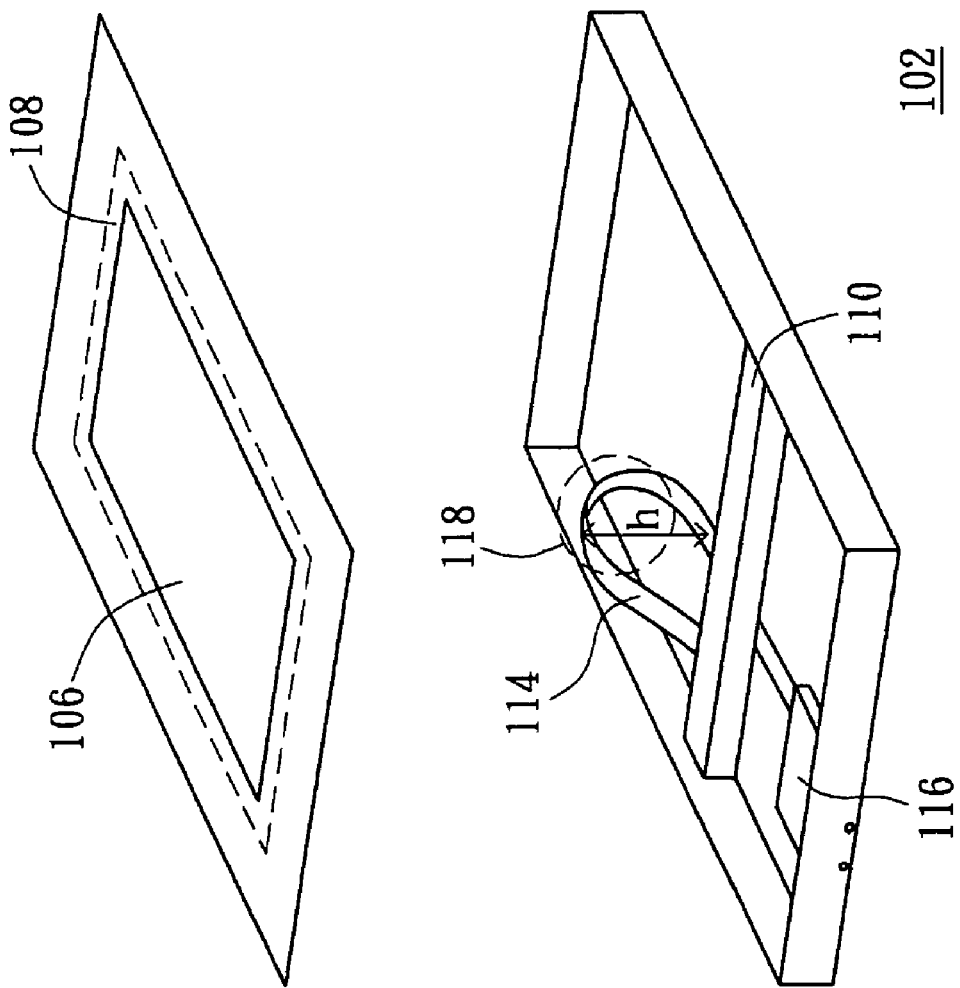
Figure 2A:
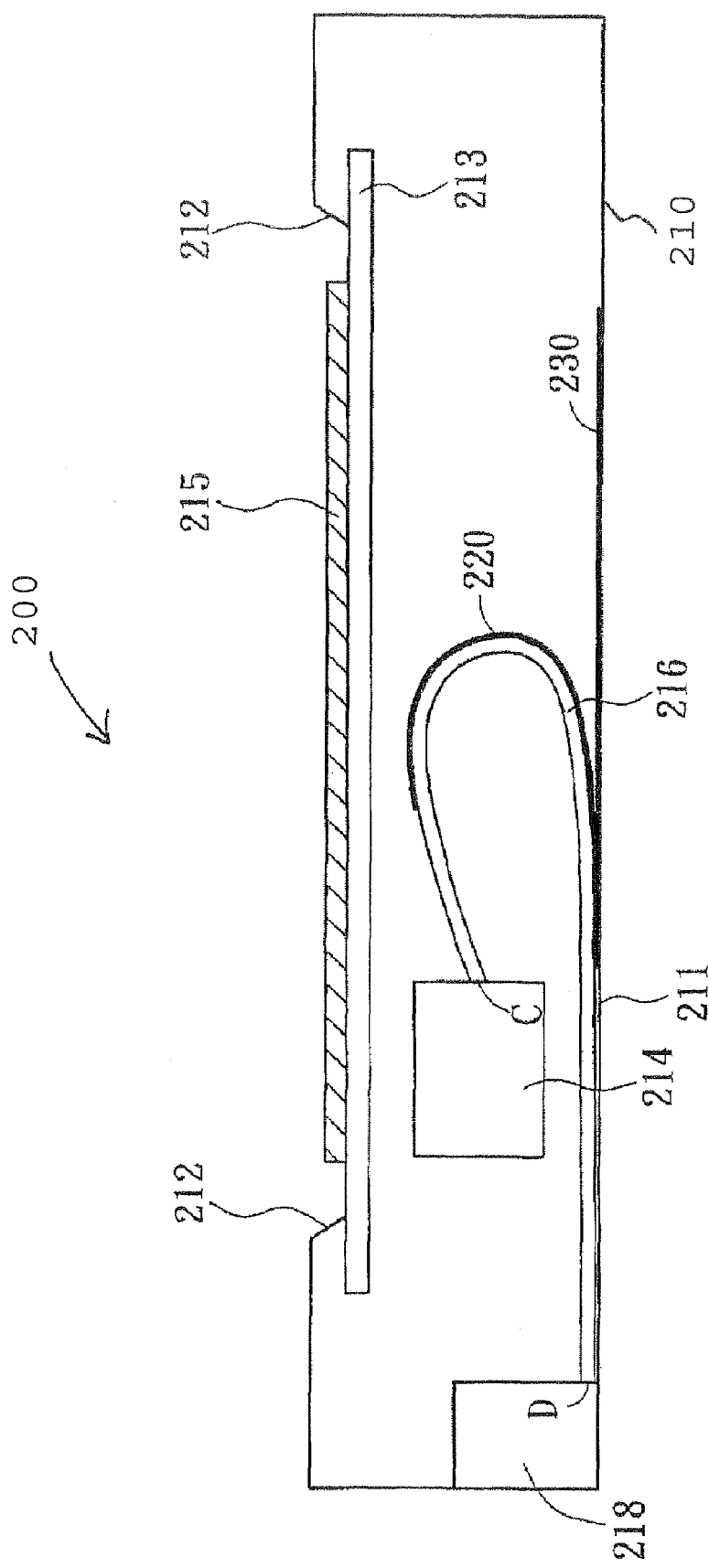
FIG. 2A is a lateral view of the scanning apparatus according to the preferred embodiment of the invention.

Referring to FIG. 2A, a lateral view of the scanning apparatus according to the first preferred embodiment of the invention is shown. The scanning apparatus 200 including a housing 210, a scan flatbed 212, a photoelectric sensing device 214, a flat cable 216, and a motherboard 218. A loading glass 213 is installed at the scan flatbed 212 for loading a to-be-scanned document 215. When the document 215 is to be scanned, light signals corresponding to the to-be-scanned document 215 are sensed and transformed to electric signals by the photoelectric sensing device 214. Moreover, the electric signals are transmitted to the motherboard 218 by the flat cable 216 and then the first image is generated. The photoelectric sensing device 214 is driven to scan the to-be-scanned document 215 by repeating the procedure mention above until the final scanning image is output to complete the scanning progress.

Figure 2C:
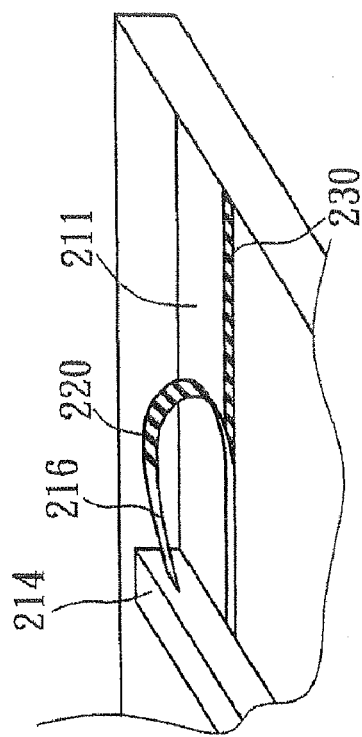
FIG. 2C shows that the first and the second adsorptive slices adsorbing each other section by section according to the preferred embodiment of the invention.
Figure 2B:
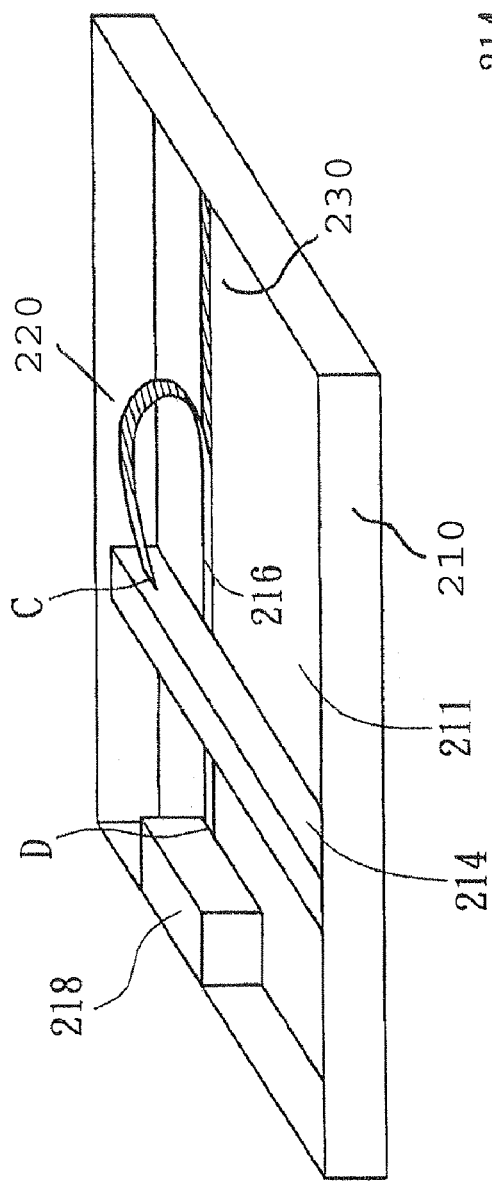
FIG. 2B is an inner structural diagram of the scanning apparatus according to the preferred embodiment of the invention.

The flat cable 216 bent around the bottom of photoelectric sensing device 214 includes a first terminal C connected to the photoelectric sensing device 214 and a second terminal D connected to the motherboard 218. The main feature of the invention is to add adsorptive materials between the flat cable 216 and the bottom 211 of the housing 210. The adsorptive materials can be the first adsorptive slice 220 and the second adsorptive slice 230 as shown in FIGS. 2A and 2B. The adsorptive materials can be magic felts adhere to each other section by section as shown in FIG. 2C or soft magnetic slices with slight magnetism provided that the magnetism does not affect the movement of the flat cable 216.

When the photoelectric sensing device 214 carries the flat cable 216 and moves to pre-scan or scan the to-be-scanned document 215, the touching area between the flat cable 216 and the bottom 211 of the housing will change. The first adsorptive slice 220 and the second adsorptive slice 230 corresponding to the touching area between the flat cable 216 and the bottom 211 adsorb each other. Therefore, the raised part 118 of the flat cable 114 in prior art will not touch the loading glass 213 and the quality of the scanning image can be improved.

The scanning apparatus according to the invention has a simple and novel design. The raised part of the flat cable in the prior art fails to rub against the loading glass by adding adsorptive materials between the flat cable and the bottom of the housing. Thus, the improved scanning apparatus optimizes the quality of the scanning image.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A cable guiding system, comprising:
    a cable connected to an image sensing device within a scanner housing;
    a first adsorptive slice attached to the cable; and
    a second adsorptive slice attached to the scanner housing, wherein the first adsorptive slice and the second adsorptive slice are configured to adhere to each other when the image sensing device moves within the scanner housing to prevent the cable from contacting a document loading glass.

2. The cable guiding system of claim 1, wherein the image sensing device comprises a photoelectric sensor.

3. The cable guiding system of claim 1, wherein the first adsorptive slice comprises a magnetic material.

4. The cable guiding system of claim 1, wherein the cable is configured to couple the image sensing device to a circuit board within the scanner housing.

5. The cable guiding system of claim 1, wherein the second adsorptive slice comprises a magnetic material.

6. The cable guiding system of claim 1, wherein the first adsorptive slice comprises adhesive felt.

7. A scanning apparatus, comprising:
    a housing;
    a sensor positioned within the housing;
    a circuit board positioned within the housing; and
    a cable coupled between the sensor and the circuit board, wherein the cable comprises a first adsorptive slice, wherein a second adsorptive slice is located on a surface of the housing, and wherein the first adsorptive slice is configured to adhere to the second adsorptive slice.

8. The scanning apparatus of claim 7, wherein the sensor is configured to move along a length of a document during a scanning operation, and wherein as the sensor is moved, an area of the first adsorptive slice adhering to the second adsorptive slice increases.

9. The scanning apparatus of claim 8, wherein an adhesion between the first and second adsorptive slices is configured to prevent the cable from contacting a loading glass mounted on the housing.

10. The scanning apparatus of claim 7, wherein the cable comprises a ribbon cable.

11. The scanning apparatus of claim 10, wherein the cable comprises the first adsorptive slice extending along a side of the cable.

12. The scanning apparatus of claim 10, wherein the first and second adsorptive slices comprise adhesive felt.

13. A scanning apparatus, comprising:
a housing;
a photoelectric sensor positioned within the housing, wherein the photoelectric sensor is configured to move along a length of the housing during a scanning operation;
a circuit board positioned within the housing;
a cable coupled between the photoelectric sensor and the circuit board;
a first adsorptive slice attached to a first side of the cable facing a bottom of the housing; and
a second adsorptive slice positioned on a surface of the housing, wherein the first adsorptive slice is configured to adhere to the second adsorptive slice, wherein as the photoelectric sensor is moved, an area of the first adsorptive slice adhering to the second adsorptive slice increases, and wherein an adhesion between the first and second adsorptive slices is configured to prevent the cable from contacting a loading glass mounted on the housing.

14. The scanning apparatus of claim 13, wherein the first and second adsorptive slices comprise a magnetic material.

15. A method, comprising:
coupling a photoelectric sensor to a circuit board within a scanner housing via a cable;
arranging the photoelectric sensor for movement along a length of a document during a scanning operation; and
adsorptively adhering the cable to the housing so as to prevent the cable from contacting a loading glass during the scanning operation.

16. The method of claim 15, further comprising arranging the cable for increasing a contact area between the cable and the housing as the photoelectric sensor moves along the length of the document during the scanning operation.

17. The method of claim 16, wherein the cable comprises a ribbon cable.

18. The method of claim 17, wherein adsorptively adhering the cable to the housing comprises contacting a first adsorptive slice attached to the cable with a second adsorptive slice located on the housing.

19. The method of claim 18, wherein the first and second adsorptive slices comprise a magnetic material.

20. An apparatus, comprising:
means for coupling a photoelectric sensor to a circuit board within a scanner housing;
means for moving the photoelectric sensor along a length of a document during a scanning operation; and
means for adsorptively adhering the means for coupling to the scanner housing during the scanning operation to prevent the means for coupling from contacting a loading glass.

21. The apparatus of claim 20, further comprising means for continuously increasing a contact area between the means for coupling and the housing as the photoelectric sensor moves along the length of the document during the scanning operation.

* * * * *

UNITED STATES PATENT AND TRADEMARK OFFICE
CERTIFICATE OF CORRECTION

| | | |
|---|---|---|
| PATENT NO. | : 7,751,100 B2 | Page 1 of 1 |
| APPLICATION NO. | : 11/508022 | |
| DATED | : July 6, 2010 | |
| INVENTOR(S) | : Chang | |

It is certified that error appears in the above-identified patent and that said Letters Patent is hereby corrected as shown below:

Title Page
At section (54), please replace "METHOD AND APPARATUS FOR GUIDING A CABLE IN A SCANNER" with --SCANNER CABLE GUIDE--.
At column 1, line 1, please replace "METHOD AND APPARATUS FOR GUIDING A CABLE IN A SCANNER" with --SCANNER CABLE GUIDE--.

Signed and Sealed this
Third Day of May, 2011

David J. Kappos
*Director of the United States Patent and Trademark Office*